Oct. 21, 1952    J. L. MAHER ET AL    2,614,658
METHOD FOR RECOVERING GASEOUS HYDROCARBONS
Filed April 26, 1950    2 SHEETS—SHEET 1
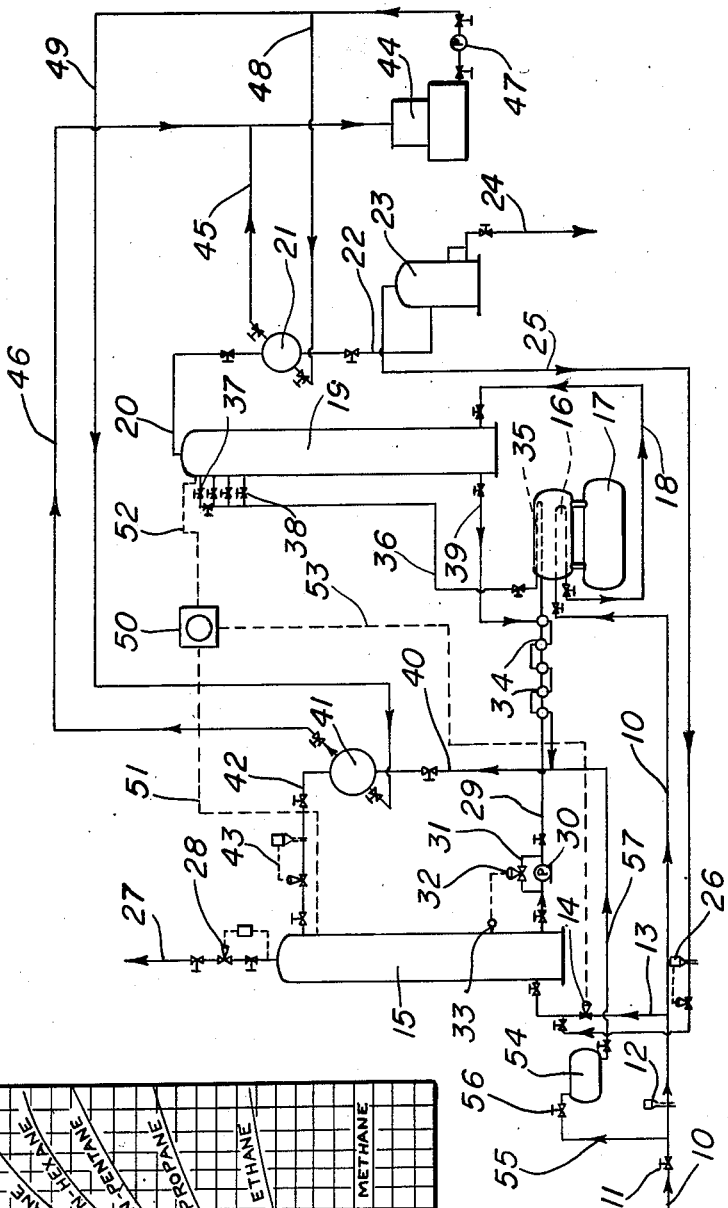
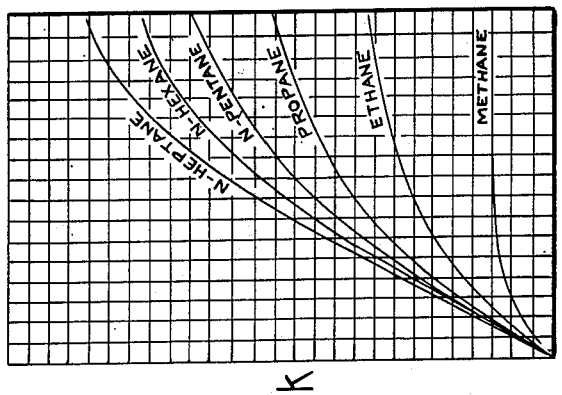
Charles O. Meyers
Joseph L. Maher
INVENTORS
BY Ashley & Ashley
Attorneys

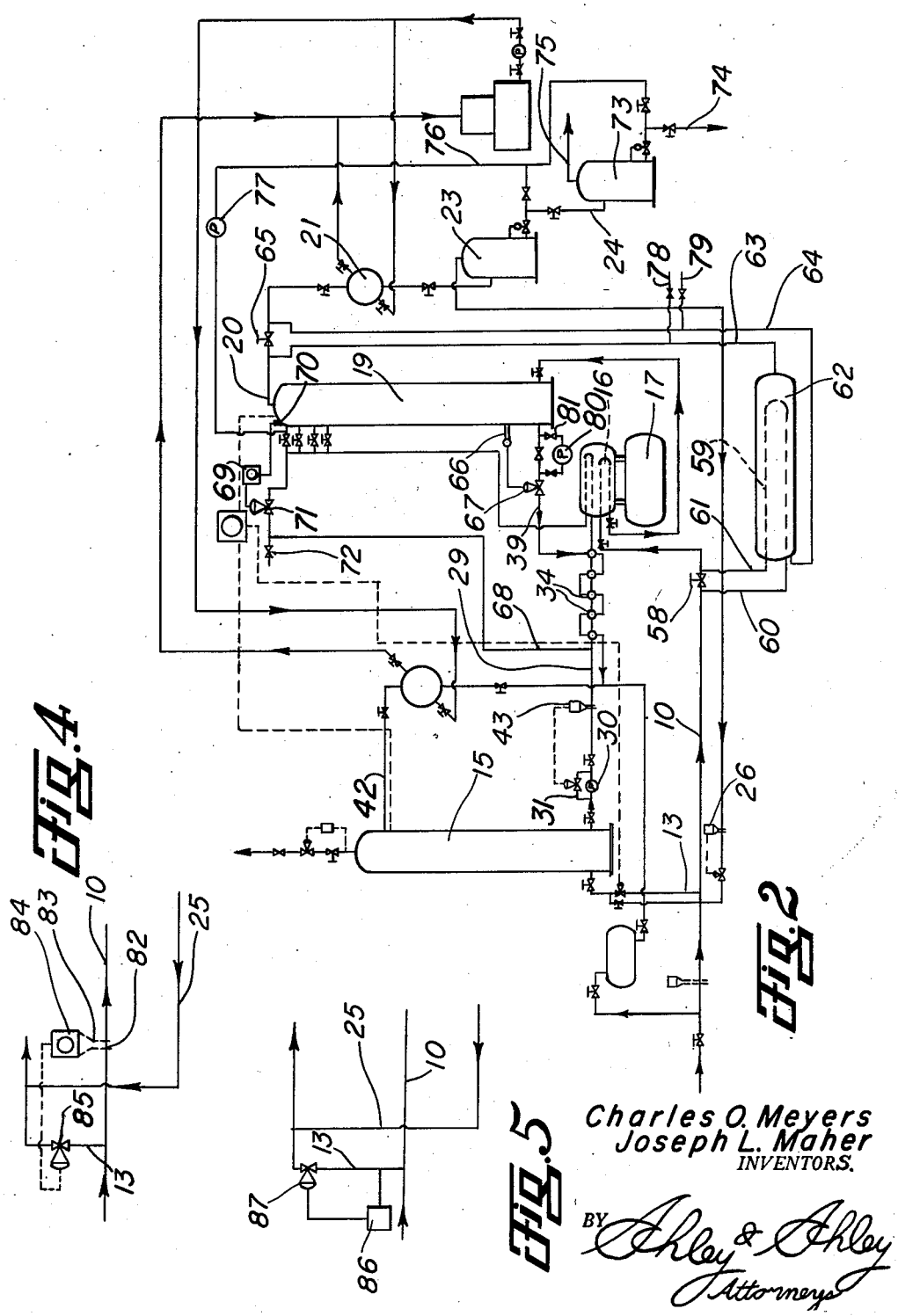

UNITED STATES PATENT OFFICE 2,614,658

METHOD FOR RECOVERING GASEOUS HYDROCARBONS

Joseph L. Maher and Charles O. Meyers, Tulsa, Okla., assignors to National Tank Company, Tulsa, Okla., a corporation of Nevada Application April 26, 1950, Serial No. 158,092

14 Claims. (Cl. 183—114.6)

This invention relates to new and useful improvements in methods and means for recovering hydrocarbons from gaseous fluids.

As will be shown, the improved methods and means herein disclosed, are a departure from applications of apparatus and methods previously employed for this purpose.

In the past, various hydrocarbons or petroleum products have been removed from streams of natural or hydrocarbon gas in varying amounts and with varying degrees of success by many methods and many different types of apparatus. The circumstances and conditions prevalent in each installation have governed the applicability of the various methods and systems, and have determined the economic feasibility of attempting such hydrocarbon removal. The principal controlling factors are, the quantity of gas to be processed or available for processing, the hydrocarbon content of the gas, the method of disposal of the processed gas along with the conditions prerequisite thereto, and in some cases, the hydrocarbons it is desired to remove.

The first two factors are interrelated to a considerable extent in that the ultimate cost of a system or method must be calculated as the cost per gallon of saleable product recovered, and the efficacy of the installation judged on this basis. A particular plant might operate at a profit by handling 50,000,000 cubic feet per day of gas containing one gallon per 1,000 cubic feet of a recoverable and saleable hydrocarbon product. The same plant might not show a profit when only 20,000,000 cubic feet of the same gas was available each 24 hours. In another installation, richer gas might be available so as to justify the cost of a recovery system.

It is also to be noted that natural gas is normally sold on the basis of its B. t. u. content. Some gas companies will not buy gas having less than a certain minimum B. t. u. content, but will not pay a premium for any excess calorific value the gas may have. Further, certain maximums of liquid content of the gas are often set to avoid the possibilities of damage to compressors, difficulties in flow, pipeline freezing, etc. Therefore, it is sometimes advantageous to remove at least a portion of the recoverable hydrocarbons from a gas stream to meet the requirements of the purchaser of the gas. This is true even though the recovery system may operate at a loss since otherwise, the entire gas production might not be marketable or might have to be sold at a reduced rate.

Thus, there are many situations in which it is desirable or advantageous for one reason or another to remove at least part of the condensible hydrocarbons from a gas stream. Sometimes gas in sufficient quantities and of sufficient richness is involved so that the installation of an expensive plant is justified. In many cases, however, either the quantities of gas are too small or the gas is too lean, and the cost of the plant cannot be amortized.

It is a principal object of this invention to meet this need for a low-cost method and means for recovering hydrocarbons from a gaseous stream, and to provide a system which is relatively small and can be moved from one location to another without complete dismantling.

The need for a low-cost solution to this problem has not been met in the past, because the systems in use have been costly to install and expensive to operate. High recoveries are necessary to justify their use. Obviously, such a system could not be employed simply to dry a gas stream to a marketable condition.

The usual type of system involves the passing of an absorbent oil in intimate contact with the gas stream to absorb certain constituents therefrom. The enriched, absorbent oil is then stripped of the removed constituents, and the stripped or denuded oil is returned to the absorption step. Various methods have been used to effect stripping of the oil, probably the most common being steam stripping which is a variation of the well-known steam distillation principle. Of course, this method requires steam plants, elaborate condensing facilities, and other expensive equipment.

There have also been developed methods in which a portion of the gas stream is heated and employed for stripping. That type of system has involved pressure reduction, however, and unless the stripping gas is to be lost, it must be compressed to a pressure at which it can be reintroduced into the main gas stream. Such compression necessitates additional equipment and comprises a constant and expensive power load on the system. None of these methods or apparatuses have provided a low-cost solution to the need for an adequate recovery system applicable under the various conditions which have been described to accomplish the various objects which have been set forth. In many cases, the cost of the system or the expense of operation thereof are either, or both, too high.

It is also known that the vaporization equilibrium constants of the paraffin homologues in a light oil undergo a great change as the applied pressure is increased or decreased. (Natural Gasoline Supply Men's Association Technical Manual, 5th ed., 1946, pp. 63–71.) That is, there is a smaller percentage or ratio of a hydrocarbon in solution in an absorbent liquid at a low pressure at a given temperature than there is at a high pressure for the same temperature. Also, as one progresses upwardly through the methane series, it is noted that the percentage of transition for increasing temperature increases as the length of the carbon chain increases. Methane, especially at higher pressures, has almost flat curves of vaporization equilibrium constants as plotted against temperature. Ethane gives a family of curves of positive slope, while propane provides curves of increased slope. As will be described more fully hereinafter, the chart illustrated in Fig. 3 of the drawings conveys the phenomena above recited, and illustrates its applicability to apparatus of the type described herein when the same is used for recovery of hydrocarbons.

It is advantageous for the purpose of this invention that the absorbent oil remain substantially saturated at all times with the light hydrocarbons, methane, ethane and propane. The heats of absorption of the light hydrocarbons are considerable, and because the gas streams usually processed for recovery of natural gasoline, are almost always composed largely of the lighter gases such as methane and ethane, quantities of these gases would be absorbed in a completely denuded oil. Of necessity, there would be a considerable temperature rise in the absorbing unit, and to absorb the more valuable hydrocarbons, some form of intercooling between absorption stages would be desirable. This is particularly true in high pressure operations. By reducing to a minimum the absorption of the lighter gases, the heat load on the system of this invention is considerably reduced and much expensive equipment is eliminated.

A further disadvantage in absorbing methane, ethane, propanes, and a large percentage of the butanes, is to be found in the fact that the ultimate product must be stabilized for marketing. Further, the constituents from a stabilization or a flashing operation at a low pressure are substantially large by volume and cannot readily be returned to the main gas stream without a considerable expense for compression. The apparatus and method herein set forth flashes only a small percentage of vapors at a low pressure, and they are used as a portion of the fuel required for the apparatus and method.

The present invention solves a major portion of the difficulties above set forth and provides an economical method and means for the extraction of hydrocarbons from gaseous streams, and the ultimate recovery of a product conforming closely to natural gasoline specifications. The invention is particularly applicable to relatively small installations of the size which heretofore have been afforded no recovery plant of the conventional type because of economic limitations. Further the invention is applicable in plants or systems of large capacity. The thermal load of the entire system is relatively low so that a minimum of cooling facilities are required, while the recovered product is readily marketable without further treatment and is normally as stable as crude oil or distillates. Many gas-distillate wells are now being penalized because no economic means has yet been provided which will denude the gas of sufficient quantities of hydrocarbons as to prevent difficulty, such as condensation, in high pressure gas transmission lines. The present invention may readily be employed in such situations as well as for the handling of larger quantities of gas.

It has further been found that some plants are too efficient and denude a gas so completely that its B. t. u. content is reduced below the minimum set by the purchaser. In such cases, a portion of the recovered hydrocarbons must be returned to the gas stream, and there occurs the paradox of removing fluids from the gas stream at considerable expense only to return the fluids subsequently to the stream from which they originated. The present invention does not remove all of the hydrocarbons and avoids this lost motion.

With the foregoing in view, it is one object of the invention to provide an improved method and means for recovering or absorbing hydrocarbons from gaseous fluids in which a portion of the gas stream is diverted and employed for stripping of the absorbent oil, and then returned to the main gas stream after the hydrocarbons have been separated and recovered, and without an intermediate compression step.

Another object of the invention is to provide an improved method and means for separating hydrocarbons from a gaseous stream in which the stream is subjected to the action of an absorbent oil which is later stripped by a heated portion of the gas stream, and in which the stripping operation is carried out at a higher pressure than the absorbing step whereby the stripping gas may be returned to the main gas stream without a pressurizing step, making for economic control of an automatic plant and requiring little manual attention.

A further important object of the invention is to provide an improved method and means for separating hydrocarbons from a gaseous stream by an absorbent oil which is maintained more or less saturated at all times with the lighter hydrocarbons, methane, ethane, some propane and some butane.

An important object of the invention is to strip the absorbent oil at an elevated pressure whereby denuding the oil of the above-mentioned lighter hydrocarbons is minimized.

Another object of the invention is to provide an improved method and means of the character described which produces a gas of sufficiently high B. t. u. content for industrial consumption without further treatment.

A collateral object of the invention is to separate from the stripping gas a product which is predominately butanes and heavier hydrocarbons and requires very little, if any, stabilization before marketing.

A particular object of the invention is to provide an improved method and means of the character described which is relatively inexpensive, and which is sufficiently economical to operate as to allow the processing of gas which is too wet, or contains too much liquid per cubic foot, to permit its sale to a gas transmission lines system, and yet which does not contain sufficient recoverable hydrocarbons to offset the expense of operating a conventional system, whereby gas which would otherwise be lost or sold at a low rate may be placed in condition for normal sale and use.

An additional object of the invention is to provide an improved method and means for removing hydrocarbons from gaseous fluids by an absorbent oil in which the rich oil is passed in heat exchange relationship with the lean oil.

Another object of the invention is to provide an improved method and means for removing hydrocarbons from gaseous fluids by an absorbent oil in which the cooler stripping gas, prior to the stripping operation, is passed in heat exchange relationship with the heated and enriched stripping gas leaving the stripping step.

A further object of the invention is to provide an improved method and means for removing hydrocarbons from gaseous fluids by an absorbent oil in which rich, absorbent oil and the partially heated stripping gas are both passed through a heating step before entering the stripping step.

Yet another object of the invention is to provide an improved method and means of the character described in which the absorbent oil is passed in intimate contact with the gas stream in an absorber and then stripped in a still, wherein means is provided for maintaining the still at a pressure higher than that in the absorber.

An object of the invention is to provide an improved method and means of the character described in which a portion of the product or a fluid obtained from other sources may be introduced for dephlegmation in the stripping step.

A further object of the invention is to provide an improved method and means of the character described in which a fluid obtained from other sources may be introduced into the outlet stream of the stripping step for further condensation of hydrocarbons, such introduction being prior to, during, or after the cooling of the outlet stream, and with or without simultaneous introduction of a portion of the product or of the fluid obtained from other sources into the stripping step for dephlegmation.

A construction designed to carry out the invention will be hereinafter described together with other features of the invention.

The invention will be more readily understood from a reading of the following specification and by reference to the accompanying drawings, wherein examples of the invention are shown, and wherein:

Fig. 1 is a schematic view of a hydrocarbon absorbing system constructed in accordance with this invention and adapted to carry out the methods thereof, Fig. 2 is a view similar to Fig. 1 showing modifications of the invention, Fig. 3 is a chart illustrating the vaporization equilibrium constants of the lighter hydrocarbons, as plotted against increasing temperature, Fig. 4 is a fragmentary, schematic view of the inlet portion of the system showing an alternate control means, and Fig. 5 is a view similar to Fig. 4 illustrating yet another control means.

In the drawings, schematic diagrams are shown of arrangements for carrying out the means of this invention and its methods.

*The stripping gas*

In the specific example of the invention shown in Fig. 1, the gas stream enters the system through a pipe 10 having therein a control valve 11. The pipe passes through a flow meter or metering valve 12 which normally functions only to record the volume of gas being passed, but which may in some instances be employed to regulate the volume of gas admitted to the system.

A branch pipe 13 is connected into the pipe 10 and leads through a motor control valve 14 to the lower end of an absorber unit or tower 15. In most instances, a major portion of the gas stream will pass through the branch pipe 13 into the absorber unit, while a minor portion of the gas stream continues through the pipe 10 into a heating coil 16 disposed within a suitable heating unit 17. This minor stream of gas constitutes the body of gas which will be used in stripping the absorbent oil employed in this system, and in the average installation will amount to about twenty per cent, more or less, of the entire gas stream. As conditions vary and greater or lesser amounts of stripping gas are required, the minor or stripping stream of gas may constitute anywhere from ten to twelve per cent to about forty per cent of the entire gas stream. It is not intended that the invention be limited in any way to a particular percentage of the gas stream being employed for stripping purposes, and the recited quantities are for illustration and explanation only.

A conductor 18 leads from the heating coil 16 to the lower end of a suitable still or plate tower 19 and conducts the heated stripping or minor stream of gas from the coil 16 to the lower end of the still. The heated gas passes upwardly through the still, encountering therein the rich or hydrocarbon-laden absorbent oil as will be described more fully hereinafter. The heated stripping gas removes desirable portions of the hydrocarbons from the rich absorbent oil and leaves the upper end of the still or tower 19 as a rich stripping gas. The rich gas is conducted through a suitable pipe 20 to a cooler or condenser 21 wherein its temperature is reduced and quantities of the hydrocarbons present in the rich gas stream are condensed. The flow passes from the cooler 21 through a pipe 22 into a separator 23 which removes the condensed fractions from the stream so that they may be drawn off through a suitable outlet 24. The separated gas, from which now are condensed the hydrocarbons which are to be recovered, passes from the upper end of the separator through a pipe 25 and returns through a motor valve or rate-of-flow controller 26 into the branch line or pipe 13 downstream of the motor valve 14. The stripping gas stream thus rejoins the main gas stream after condensible fractions have been removed therefrom so that the entire body of gas passes into the absorber unit 15.

*The absorption*

The gas stream in passing upwardly through the absorber is met by a counter-current flow of lean, absorbent oil which is relatively cool and absorbs from the gas stream by far the major portion of the liquefiable hydrocarbons present therein. Some of the lighter hydrocarbons such as methane, ethane and propane will be absorbed, but the bulk of the material picked up by the absorbent oil will be butane and heavier hydrocarbons. Mineral seal oil, various petroleum fractions, and other well-known absorbent oils may be employed for this purpose. The denuded gas passes from the absorber through a pipe 27 extending from the upper end thereof and is conducted to gas pipe lines, injection wells, and to other suitable points of use or disposal. A pressure controller valve 28 is provided in the outlet pipe 27 to insure the maintenance of pressure on the system.

The absorbent oil

The absorbent oil, having picked up quantities of liquefiable hydrocarbons in the absorber 15, passes from the bottom of the latter through a pipe 29 extending through a suitable pump 30. A bypass pipe 31 extends across the pump 30 and carries a motor control valve 32 operated through a suitable float control arrangement 33 positioned in the lower portion of the absorber 15. With this arrangement, the absorbent oil is withdrawn from the absorber only as it accumulates in the bottom thereof and a minimum level is thus maintained in the absorber.

The pipe 29 passes into a series of heat exchangers 34 wherein the rich absorbent oil is preheated, and then the oil passes into a suitable heating coil 35 disposed within the heater 17. After the rich oil has been properly heated in the coil 15, it passes therefrom through a pipe 36 to the upper end of the still or plate tower 19, entering the latter through any one, or through several, of a plurality of inlets 37 provided at the upper end of the plate tower and leading to various ones of the upper plates (not shown) of said tower. Individual valves 38 are provided in the plurality of inlets 37 for control purposes.

The rich hot absorbent oil flows downwardly through the still 19 in counter-current relation to the heated stripping gas flowing upwardly therethrough from the pipe 18. In this process, the absorbent oil is subjected to gas scrubbing whereby the absorbed hydrocarbons of a liquefiable nature are removed or stripped from the stream of oil, and are carried off by the stripping gas through the gas outlet 20. The denuded or lean oil leaves the bottom of the still 19 through a pipe 39 which passes the hot lean oil to the heat exchangers 34. This arrangement provides for initial cooling of the hot lean oil, but conserves the heat content thereof by passing it to the incoming rich oil flowing through the pipe 29. The partially-cooled lean oil then flows from the heat exchangers 34 through a pipe 40 to an air cooler 41 and thence through a pipe 42 into the upper end of the absorber 15 as lean, cool absorbent oil. A motor valve or rate-of-flow controller 43 is provided in the pipe 42 for regulating the flow of absorbent oil.

The cooling

Any suitable or desirable means may be employed for reducing the temperature within the condenser 21 and the oil cooler 41, such as cooled water, refrigerants and the like. A simple water cooling system has been illustrated and includes a cooling tower 44 into which warm water flows through pipes 45 and 46 leading from the two cooling units. The cooled water is withdrawn from the tower 44 through a pump 47 and passes through pipes 48 and 49 to the condenser 21 and the oil cooler 41, respectively.

Operation

As stated hereinbefore, the minor or stripping gas stream passing through the heating coil 16 and the still 19 may constitute a variable portion of the entire gas stream. The rate-of-flow controller 26 will regulate the rate of gas flow through the stripping portion of the system and hence may be adjusted to provide for the flow of the desired quantity of gas therethrough. Since the stripping gas is to be returned to the main gas stream, it must be maintained at a pressure higher than that of said main gas stream, and a differential pressure-controller of the usual type is employed for this purpose. The maintenance of the pressure differential is accomplished through the use of a standard type of pressure differential controller 50 having a pressure connection 51 to the absorber 15 and a similar pressure connection 52 to the still 19. The controller 50 operates the motor valve 14 through a pressure line 53, the motor control valve 14 serving to reduce the pressure below or downstream thereof and hence to build up a back pressure in the pipe 10 and the still 19. It is obvious that if the flow of gas through the pipe 13 is restricted so as to maintain the absorber 15 at a pressure lower than the still 19, the flow of the stripping gas from the separator 23 through the pipe 25 into the reduced pressure zone constituted by the absorber 15 and the downstream portion of the pipe 13, will be readily accomplished. There will be a certain pressure drop in the stripping gas as it flows through the stripping cycle, and hence, a pressure differential of about 20 or 25 pounds per square inch has been found desirable. For example, if the absorber is carried at a pressure of 50 pounds, the still will be maintained at a pressure of about 75 pounds per square inch. Similarly, pressures of 150 pounds per square inch or 250 pounds per square inch in the absorber will indicate corresponding pressures of 175 pounds per square inch or 275 pounds per square inch in the still.

As to the temperatures employed, proper operation must necessarily take into consideration the temperature of the incoming gas being admitted to the system. Normally, the temperature of the gas will range from 60 to 110 degrees F., and a temperature of 90 degrees F. may be taken as an average figure. In this example, the heater 17 and the heater coil 16 should be designed to give an outlet temperature of about 350 degrees F., at which temperature the lean stripping gas will enter the still 19. Of course, the outlet temperature of the rich stripping gas will depend upon the volume of gas and absorbent oil passing through the still, and upon other well-known physical and chemical attributes of the gas and oil stream. In the example given, however, there will be an outlet temperature of about 240 degrees F. to 280 degrees F. in the gas outlet pipe 20. Again, it is emphasized that this temperature is typical only and is subject to considerable variation in accordance with the design of the system and the mode of operation thereof.

In the condenser 21, the temperature of the rich stripping gas is considerably reduced whereby the heavier components thereof condense and liquify to be removed subsequently in the separator 23. The cooling of the rich stripping gas in the condenser 21 and the separating action achieved in the separator 23 bring the temperature of the lean stripping gas leaving the separator down to an average value, at which temperature the stripping gas stream rejoins the main gas stream.

The absorbent oil passes through a similar temperature cycle in that it is preheated in the unit 34 and further heated in the coil 35 carried within the heater 17. The hot oil leaving the still 19 after having had the desirable hydrocarbons removed therefrom is partially cooled in the unit 34 and is brought down to a normal operating temperature in the oil cooler 41.

The moderate temperatures of the heated stripping gas leaving the coil 16 are not sufficient to remove from the absorbent oil large quantities of the lighter hydrocarbons, such as methane, ethane, and propane. Also, because the stripping gas consists predominantly of these paraffins and is maintained at an appreciable pressure, there is only a minor scrubbing action with respect to said lighter paraffins, whereby the absorbent oil remains substantially saturated with said light hydrocarbons. This is extremely desirable for a number of reasons.

First, it would be necessary to use much larger quantities of stripping gas and to employ said gas at a much higher temperature and lower pressure if the light hydrocarbons are to be removed from the absorbent oil. Of necessity, this would involve a considerable increase in equipment, and particularly a considerable increase of cooling facilities. The larger volumes of gas necessarily have to be adequately cooled in the condensation step, and a correspondingly larger quantity of cooling medium must be available. Indeed, it is usually necessary to employ a series of stripping steps or stages in order to remove these lighter hydrocarbons.

Second, in the event the lighter hydrocarbons are removed, facilities must be provided for their disposal. They must be removed from the liquid product which is obtained, and unless they are to be wasted completely, they must be passed through a suitable compression pump so that they may be returned to the main gas stream.

Third, it is known that the lighter hydrocarbons have very high heats of absorption. Therefore, an absorbent oil is entirely denuded of these lighter hydrocarbons would pick up additional quantities thereof in passing through the absorber 15, and there would be a considerable evolution of heat. Adequate absorption of the heavier hydrocarbons cannot be obtained at high temperatures, and hence the absorbing would have to be carried out in steps or stages, and it most probably would be necessary to cool the absorbent oil in between the steps or stages. Here again, additional equipment, expense, and cooling facilities would be required.

In the present invention, the absorbent oil remains substantially saturated with the lighter hydrocarbons at all times and these multiple disadvantages are thereby avoided. It is desirable that the methane, ethane, and propane remain in the gas stream, and hence it is never removed in appreciable quantities either in the absorber or still and remains at all times in the gaseous phase. Of course, a small percentage of the lighter hydrocarbons may be and often is removed in the condenser and separator, and some degree of "flashing" or stabilization of the liquid product may be necessary or desirable. The quantity of the lighter hydrocarbons so removed from the gas stream is maintained at a minimum, however.

It is further known that as the pressure of the system is increased, the vaporization equilibrium constants of the hydrocarbons decrease, which means that less of the lighter hydrocarbons will be removed from the absorbent oil for a given temperature at high pressure than will be removed for the same temperature at low pressure. The present system therefore reaps an additional advantage by the absence of a pressure drop between the absorber and the still and from the maintenance of a relatively high pressure in the still 19, in that a smaller percentage of the light hydrocarbons is caused to pass from an absorbed condition in the oil into the vapor phase represented by the stripping gas. This phenomenon is more marked in the case of the light hydrocarbons than in the heavier hydrocarbons whereby the maintenance of the high pressure does not materially decreasing the stripping from the oil of the heavier hydrocarbons, but is of material aid in maintaining said oil saturated with the lighter hydrocarbons. If a low pressure still were employed, there would necessarily be a drop in the pressure of the absorbent oil in passing to the still and quantities of the lighter hydrocarbons would be flashed off. Upon a return to the high pressure absorber, the oil would pick up additional quantities of the light gases and an undesirable heating effect would be encountered.

The effect of temperature alone upon the lower members of the paraffin series is illustrated in Fig. 3. This figure is a comparative plotting of the vaporization equilibrium constants of the lower hydrocarbons against increasing temperature at constant pressure. For illustration, a temperature range of 50° to 500° F. and a pressure of 500 pounds per square inch absolute were used. The equilibrium constant, K, is the ratio of hydrocarbon present in the vapor phase to that present in the liquid phase and, of course, increases with increasing temperature as more of the hydrocarbon enters the vapor phase. A scale cannot be applied in this instance for the values of K since the various curves fall at different points on the scale. They have arbitrarily been shifted and superposed for purposes of comparison. It will be noted that as the molecular weight of the hydrocarbons increases, a given change in temperature has an increasing effect upon the value of K.

There will be a small loss of the absorbent oil from this system from time to time, the loss occurring partially in the absorber because of passage of the oil with the outlet gas as mechanically entrained particles passing through the outlet pipe 27. There also may be some loss of the oil to the recovered product through the outlet pipe 20 of the still 19, and hence provision must be made for addition of absorbent oil to the system as it is required. For this purpose, a small tank or oil blow case 54 is provided. A pipe 55 leads from the inlet pipe 10 to a valve 56 into the upper portion of the tank 54, while an absorbent oil flow line 57 leads from the bottom of the tank into the pipe 40. With this arrangement, absorbent oil may be added to the oil circuit under pressure as it is required. As an alternate arrangement, a suitable pump (not shown) may be employed for adding oil to the system.

Absorber surge modification

In the form of system hereinbefore described for carrying out this invention, any surge in the absorbent oil circuit is accommodated within the confines of the still 19. This is true because a relatively constant level is held within the absorber 15 by means of the control device 33 and the motor valve 32. Obviously, it is preferable to make provisions for such surging of the absorbent oil since a constant and absolutely uniform flow of the oil throughout all portions of the system may not always be expected. As temperature and volume conditions change, there may be variations in the flow in certain parts of the oil circuit and such variation is adequately provided for within the still 19.

In the modification of the invention, shown in Fig. 2, any surges of the oil will occur within the absorber unit, and a relatively constant liquid level will be held within the still. Under some conditions, this is a preferable arrangement and offers advantages.

Other changes may be made in the system, as illustrated more fully in the drawing. A suitable shut-off valve 58 may be incorporated into the pipe 10 downstream of the lateral branch 13, and a bypass heating coil 59 connected to the pipe 10 upon each side of the valve 58 by pipes 60 and 61, respectively. The coil 59 is enclosed in a heating shell 62 which is in turn connected by pipes 63 and 64 across a shut-off valve 65 introduced into the gas outlet line 20 of the still 19. With this arrangement, the minor or stripping stream of gas may be diverted to flow through the coil 59 and be preheated therein by the hot rich stripping gas flowing from the still 19. In this manner, the stripping gas is preheated before entering the coil 16 of the heater 17, and by the heat exchange relationship established, the hot rich stripping gas receives an initial or preliminary cooling within the shell 62 before it passes to the condenser 21. The load on the condenser is thus reduced, and the heating load which must be sustained by the heater 17 is similarly reduced. It is further to be noted that a liquid level control device 66 is incorporated into the still 19 and operates a motor valve 67 positioned in the hot lean oil discharge line 39. The level in the still is thus held constant and surges in the oil system are accommodated within the absorber 15. The rate of flow controller 43 is removed from the pipe 42 to the pipe 31 by-passing the pump 30.

*Dephlegmation*

Another modification is involved in introducing a dephlegmation stream to the still 19, this being accomplished through a branch pipe 68 leading from the rich oil line 29 downstream of the oil pump 30 and upstream of the heat exchanger unit 34 to the multiple inlets 37 at the upper end of the still 19. The rate of flow of the dephlegmation stream is preferably regulated by a temperature controller 69 having its heat-responsive bulb 70 disposed in the top of the still and controlling a motor valve 71 in the pipe 68. The controller 69 may be set for the desired temperature in the top of the still and will maintain such temperature through operation of the valve 71 to admit varying quantities of the relatively cool rich absorbent oil for dephlegmation. Of course, the pump 30 provides motive power for driving oil through the pipe 68. It is sometimes desirable to introduce into this system from an outside source a hydrocarbon fluid such as crude oil or distillate from a well, compression gasoline, or other like fluids from some source and the like. Additional quantities of hydrocarbons may often be recovered in this manner. For the addition of such fluids, a branch pipe 72 is connected into the pipe 68 so that the fluids pass into the upper end of the still in place of or in addition to the dephlegmation stream flowing through the pipe 68. Obviously, both, either, or neither of the sources of dephlegmating fluid may be used as the conditions and circumstances of a particular installation indicate. The gas being processed, the product desired, and the availability and nature of an outside source of hydrocarbon fluid will determine the procedure to be employed.

In the modification shown in Fig. 2, a provision has also been illustrated for partial stabilization of the end product recovered in the separator 23, the discharge pipe 24 of said separator leading to a second and low pressure separator 73. Within the separator 73, the light hydrocarbons methane, ethane, and some propane and butane, are flashed off by pressure reduction, and the remaining liquid passes to storage through a discharge line 74. The gas which is flashed off within the stabilizer or low pressure separator 73 is removed through a gas discharge pipe 75, and is preferably used within the system as fuel for the heater 17, or to operate the engines (not shown) driving the various pumps. It has been found that this flashed off gas constitutes approximately one per cent of the total gas flow and may be completely employed without any waste as a source of heat and power within the system itself.

In yet another modification of the invention, which may be used to advantage in many cases, a portion of the recovered hydrocarbons or product may be withdrawn from the separator discharge pipe 24 or the discharge pipe 74 and pumped through a pipe 76 to the upper end of the still by a suitable pump 77. Here again, a dephlegmation stream is provided, in this case by the product of the system, and additional quantities of the hydrocarbons will be condensed and recovered.

As an alternate procedure, a suitable condenser (not shown) may be provided at the upper end of the still to condense vapors passing from the still and return them thereto as a reflux. In each of the arrangements described, suitable temperature-responsive control units are preferably employed to regulate the volume of the dephlegmation or reflux streams and to establish the desired still overhead temperatures.

*Secondary absorption*

It has also been found desirable in some cases to introduce a secondary absorbent fluid into the gas stream leaving the still to absorb and condense hydrocarbons therefrom. Although the secondary fluid may be flowed into the line 20 immediately upstream of the separator 23, it is usually preferable to introduce the fluid into the pipe 63 leading to the heat exchange 62, or into the pipe 64 upstream from the condenser 21. Usually, the secondary absorption fluid will be relatively cool, and it serves further to cool the effluent gas stream. In addition, the fluid may be relatively unsaturated with some of the lighter hydrocarbons and will absorb such hydrocarbons from the effluent stream. Branch pipes 78 and 79 are connected, respectively, into the pipes 63 and 64 for the addition of the secondary absorption fluid.

Normally, the secondary absorption fluid will be obtained from the same outside sources as set forth in connection with the dephlegmation stream. A particularly advantageous arrangement has been found to include division of the stream of fluid obtained without the system, and flowing a portion thereof to the top of the still for dephlegmation and a portion to the effluent gas line leading from the still. The fluid may be divided in any suitable ratio depending upon the quantity of supply and the conditions obtaining within this system. In many cases, however, it is desirable to introduce a minor portion through the pipe 72 to the still and a somewhat larger quantity through one of the pipes 78 and 79 into the rich stripping gas flowing through the still.

Occasionally, it is desirable to employ the methods and means herein disclosed in installations where only a small pressure drop is permissible. In such cases, a pump 80 is preferably connected into a bypass conductor 81 incorporated in the hot lean oil line 39 between the still and the liquid level controller 67. The pump serves to drive the oil through the heat exchanger 34 and the oil cooler 41 to the top of the absorbing unit 15 and relieves the system of the pressure differential necessary to accomplish this flow. Therefore, a lower pressure differential may be employed between the still and the absorber, and the overall pressure drop through the system materially reduced. Of course, this arrangement is particularly adaptable to systems processing a low pressure stream of gas, but it is to be noted that it is also applicable in high pressure installations and to all of the modifications disclosed herein.

Not only is a small pressure drop desirable in low pressure systems to minimize the loss in flowing pressure of the gas stream, but also to avoid any adverse effect upon the absorption step. Absorption efficiency drops with pressure, and a pressure drop of 10 or 20 pounds per square inch in a system operating at 35 pounds per square inch has a much more marked effect than such a drop in a system operating at, say, 250 pounds per square inch.

As an example of the recovery effected by the methods and means of this invention, a typical analysis of the incoming gaseous stream may be as follows:

| Components | Mol, Percent [1] | Gals./M. C. F. |
|---|---|---|
| Methane & Lighter [2] | 87.69 | |
| Ethane | 3.03 | |
| Propane | 2.00 | 0.549 |
| Butane | 2.12 | 0.670 |
| Pentane | 1.28 | 0.465 |
| Hexane | 0.38 | 0.156 |
| Heptane Plus | 0.43 | 0.208 |
| Carbon Dioxide | 3.07 | |
| Total | 100.00 | 2.048 |
| Gasoline Contents | | 1.275 Gals./M. C. F. of 26# R. V. P. |
| | | 0.947 Gals./M. C. F. of 14# R. V. P. |

[1] Equivalent to gas volume percent.
[2] Oxygen 1.05% equivalent to 5.05% air.

After passing through the system, a typical gaseous stream may have an analysis as follows:

| Components | Mol, Percent [1] | Gals./M. C. F. |
|---|---|---|
| Methane & Lighter [2] | 90.47 | |
| Ethane | 2.79 | |
| Propane | 1.84 | 0.505 |
| Butane | 1.47 | 0.47 |
| Iso-Pentane Plus | 0.29 | 0.106 |
| Carbon Dioxide | 3.14 | |
| Total | 100.00 | 1.081 |
| Gasoline Contents | | 0.163 Gals./M. C. F. of 26# R. V. P. |
| | | 0.122 Gals./M. C. F. of 14# R. V. P. |

[1] Equivalent to gas volume percent.
[2] Oxygen 0.84% equivalent to 4.04% air.

Analysis of the liquid recovered by the system before stabilization or flashing of the same, in a typical case, would be as follows:

| Components | Mol, Percent [1] | Weight, Percent | Liquid Vol., Percent |
|---|---|---|---|
| Methane & Lighter | 7.75 | 1.76 | 3.69 |
| Ethane | 2.38 | 1.01 | 1.70 |
| Propane | 3.92 | 2.44 | 3.03 |
| Iso-Butane | 2.29 | 1.89 | 2.11 |
| N-Butane | 19.39 | 15.95 | 17.17 |
| Iso-Pentane | 20.82 | 21.25 | 21.38 |
| N-Pentane | 16.59 | 16.94 | 16.88 |
| Hexane Plus | 26.86 | 38.76 | 34.04 |
| Total | 100.00 | 100.00 | 100.00 |

Molecular weight of hexane plus (assumed) _____ 102.00
Specific gravity of hexane plus _____ 0.7157
API gravity of hexane plus (corr. 60° F.) _____ 66.2

[1] Equivalent to gas volume percent.

Typical data obtained upon distillation of the product is as follows:

| | Run #1 | Run #2 | Run #3 |
|---|---|---|---|
| IBP _____ degrees | 88 | 68 | 70 |
| 5% _____ do | 90 | 78 | 78 |
| 10% _____ do | 94 | 84 | 83 |
| 20% _____ do | 106 | 94 | 94 |
| 30% _____ do | 114 | 104 | 101 |
| 40% _____ do | 122 | 112 | 110 |
| 50% _____ do | 130 | 122 | 120 |
| 60% _____ do | 140 | 132 | 131 |
| 70% _____ do | 152 | 148 | 146 |
| 80% _____ do | 172 | 166 | 167 |
| 90% _____ do | 205 | 208 | 230 |
| End Point _____ do | 360 | 370 | 335 |
| Percent Evap. @ 140° | 60 | 64 | 66 |
| Percent Evap. @ 275° | 91 | 91.5 | 91 |
| Recovery _____ percent | 93.5 | 91.5 | 91.0 |
| Residue _____ do | 1.2 | .8 | .7 |
| Degrees A. P. I. | 83.5 | 86.0 | 87.1 |

The accepted specifications of marketable natural gasoline are as follows:

1. Reid vapor pressure—10 to 34 pounds
2. Percentage evaporated at 140° F.—25 to 85
3. Percentage evaporated at 275° F.—not less than 90.
4. End point—not higher than 375° F.
5. Corrosion—non-corrosive
6. Doctor test—negative, "sweet."
7. Color—not less than plus 25 (Saybolt)

The products recovered by the system of this application more than meet the requirements of these specifications, having a Reid vapor pressure well within the allowed range, the above three examples having a Reid vapor pressure of approximately 27 pounds per square inch. The product is water white, or about 30 as judged upon the Saybolt scale. All requirements of the specifications are met.

Since the flow of the stripping gas stream is dependent upon the maintenance of a pressure difference between the still and the absorber, modifications for accomplishing this result are shown in Figs. 4 and 5. In Fig. 4, the means and method illustrated include a suitable orifice fitting 82 connected into the stripping gas conductor 10 and having pressure connections 83 to a rate of flow controller 84. The latter device is of the usual type and controls a motor valve 85 positioned in the main gas conductor 13 to maintain the differential pressure in the line 10 and maintain a substantially constant rate of flow therethrough.

In the modification shown in Fig. 5, a simple fixed pressure-drop arrangement is employed, a regulating device 86 of the usual type being connected into the line 13 and controlling a motor valve 87 to maintain a substantially constant pressure drop across the latter valve regardless of the upstream pressure. The substantially constant pressure drop in the pipe 13 will insure a substantially constant rate of flow through the stripping gas line 10. In both cases, the conductor 25 returns the stripping gas stream to the line 13 downstream of the control apparatus.

The invention thus provides a relatively inexpensive and simple system and method for removing from natural gas streams a liquid hydrocarbon product readily marketable as natural gasoline without additional or further treatment. At the same time, the marketability of the gas as natural gas is increased, or at least, not impaired to an extent equaling the value of the liquid products obtained.

Although the invention is particularly adaptable to gas streams flowing at a relatively high pressure, it may also be used to advantage in low pressure systems as set forth hereinabove. The pressure drop through the system is maintained at a minimum, and in cases where very low drops are desired, a pump for the lean oil flow may be employed. In each case, the pressure drop is maintained in consonance with the pressure of the gas supply. Although absorption is less complete at lower pressures, provision is made for minimizing the pressure drop and avoiding further adverse effects upon the absorption rate. In addition, the operating of the still at substantially the pressure of the incoming gas stream and slightly above the pressure of the absorbing unit prevents denuding the absorption oil of methane and the lighter paraffins, and avoids the difficulties and expenses attendant to such denuding.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. The method of removing hydrocarbons from gaseous streams, including, passing the stream in intimate contact with a lean absorbent oil to enrich the oil and remove hydrocarbons from the stream, dividing the gaseous stream prior to the absorbing step into a main stream and a stripping stream, heating the stripping stream, passing the heated stripping stream and the enriched absorbent oil in intimate contact to vaporize hydrocarbons from the oil substantially denuding the latter and enriching the stripping stream, removing the hydrocarbons from the enriched stripping stream and recovering the same, reducing the pressure of the main stream while maintaining the pressure of the stripping stream to provide a pressure differential between the main stream and the stripping stream, subsequently recombining the denuded stripping stream and the reduced-pressure stream to reconstitute the gaseous stream, and returning the denuded oil to the absorbing step, the enriched oil denuding step being carried out at a pressure above that of the absorbing step, and the denuded oil being maintained at a pressure above that of the absorbing step until the denuded oil is returned to the absorbing step.

2. The method of removing hydrocarbons from gaseous streams, including, passing the stream in intimate contact with a lean absorbent oil to enrich the oil and remove hydrocarbons from the stream, dividing the gaseous stream prior to the absorbing step into a main stream and a stripping stream, heating the stripping stream, passing the heated stripping stream and the enriched absorbent oil in intimate contact to vaporize hydrocarbons from the oil rendering the latter lean and enriching the stripping stream, cooling the enriched stripping stream to condense the hydrocarbons, separating the condensed hydrocarbons from the stripping stream to denude the latter, reducing the pressure of the main stream while maintaining the pressure of the stripping stream to provide a pressure differential between the main stream and the stripping stream, subsequently recombining the denuded stripping stream and the reduced-pressure main stream to reconstitute the gaseous stream, and returning the lean oil to the absorbing step, the enriched oil denuding step being carried out at a pressure above that of the absorbing step, and the denuded oil being maintained at a pressure above that of the absorbing step until the denuded oil is returned to the absorbing step.

3. The method as set forth in claim 2, and passing the enriched oil in heat exchange relationship with the lean oil.

4. The method as set forth in claim 2, and heating the enriched oil prior to the stripping step.

5. The method as set forth in claim 2, and passing the lean stripping stream in heat exchange relationship with the enriched stripping stream.

6. The method as set forth in claim 1, and combining a hydrocarbon liquid with the enriched stripping stream prior to the removal of hydrocarbons therefrom.

7. The method as set forth in claim 1, and introducing an outside liquid hydrocarbon stream into the stripping stream during the step of passing the heated stripping stream and the enriched absorbent oil in intimate contact.

8. The method as set forth in claim 1, and introducing an outside liquid hydrocarbon stream into the stripping stream subsequent to the step of passing the heated stripping stream and the enriched absorbent oil in intimate contact.

9. The method as set forth in claim 2, and introducing an outside liquid hydrocarbon stream into the stripping stream subsequent to the step of passing the heated stripping stream and the enriched absorbent oil in intimate contact during the step of cooling the enriched stripping stream.

10. The method as set forth in claim 2, and introducing an outside liquid hydrocarbon stream into the stripping stream during the step of passing the heated stripping stream and the enriched absorbent oil in intimate contact and also during the step of cooling the enriched stripping stream.

11. The method of removing hydrocarbons from gaseous streams including, passing the stream in intimate contact with a lean absorbent oil to enrich the oil and remove hydrocarbons from the stream, dividing the gaseous stream into a main stream and a stripping stream, heating the stripping stream, passing the heated stripping stream and the enriched absorbent oil in intimate contact to remove hydrocarbons from the oil substantially denuding the latter and enriching the stripping stream, removing the hydrocarbons from the enriched stripping stream and recovering the same, maintaining the enriched absorbent oil at approximately the pressure of the absorbent step to minimize the removal of light hydrocarbons from the absorbent oil, subsequently discharging the denuded stripping stream, and returning the denuded oil to the absorbing step, the absorbent oil being maintained at all times at approximately the pressure of the absorbing step.

12. The method of removing hydrocarbons from gaseous streams including, passing the stream in intimate contact with a lean absorbent oil to enrich the oil and remove hydrocarbons from the stream, dividing the gaseous stream prior to the absorbing step into a main stream and a stripping stream, heating the stripping stream, passing the heated stripping stream and the enriched absorbent oil in intimate contact to remove hydrocarbons from the oil substantially denuding the latter and enriching the stripping stream, removing the hydrocarbons from the enriched stripping stream and recovering the same, maintaining the enriched absorbent oil at approximately the pressure of the absorbent step to minimize the removal of light hydrocarbons from the absorbent oil, subsequently recombining the denuded stripping stream and the main stream to reconstitute the gaseous stream prior to the passage of the gaseous stream in intimate contact with the lean absorbent oil, and returning the denuded oil to the absorbing step, the absorbent oil being maintained at all times at approximately the pressure of the absorbing step.

13. The method of removing hydrocarbons from gaseous streams as set forth in claim 11 wherein the stripping step is maintained at a pressure above that of the absorbing step whereby the absorbent oil is maintained substantially saturated with light hydrocarbons, and whereby the stripping gas stream is maintained under a sufficient pressure differential to recombine with the main gas stream.

14. The method as set forth in claim 1, and combining a hydrocarbon liquid with the stripping stream subsequent to the division of the stripping stream from the main stream and prior to the removal of hydrocarbons from the stripping stream.

JOSEPH L. MAHER.
CHARLES O. MEYERS.

REFERENCES CITED

The following references are of record in the file of this patent:

UNITED STATES PATENTS

| Number | Name | Date |
| --- | --- | --- |
| 1,869,611 | Nichols et al. | Aug. 2, 1932 |
| 1,987,267 | Ragatz | Jan. 8, 1935 |
| 2,038,834 | Frey | Apr. 28, 1936 |
| 2,157,343 | Mateer et al. | May 9, 1937 |
| 2,477,367 | Garrison | July 26, 1949 |